Feb. 10, 1925.                                            1,525,743
R. K. JACK
SEAT SUPPORT
Filed Sept. 2, 1921
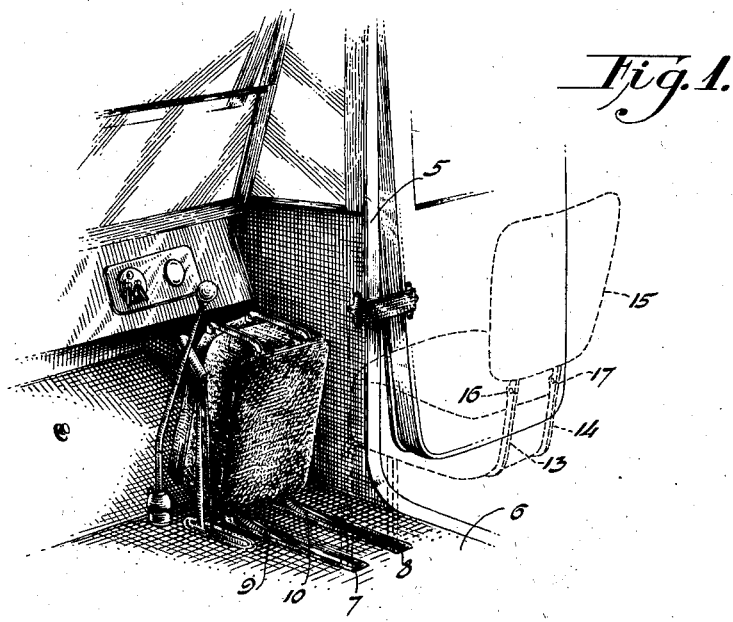
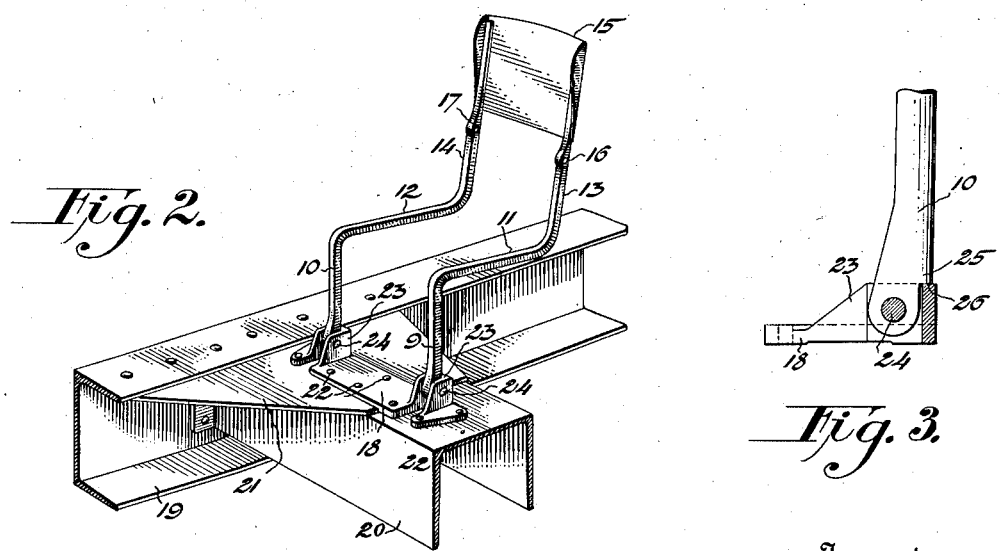

Patented Feb. 10, 1925.

1,525,743

UNITED STATES PATENT OFFICE.

ROBERT K. JACK, OF LANSING, MICHIGAN, ASSIGNOR TO GENERAL MOTORS CORPORATION, OF DETROIT, MICHIGAN, A CORPORATION OF DELAWARE.

SEAT SUPPORT.

Application filed September 2, 1921. Serial No. 497,960.

*To all whom it may concern:*

Be it known that I, ROBERT K. JACK, a subject of the King of Great Britain, and a resident of Lansing, county of Ingham, and State of Michigan, have invented certain new and useful Improvements in Seat Supports, of which the following is a full, clear, concise, and exact description, such as will enable others skilled in the art to which the invention relates to make and use the same, reference being made therein to the accompanying drawings, which form a part of this specification.

The invention relates to seat supports and is especially concerned with supports of the type ordinarily employed in connection with auxiliary or folding seats or chairs in motor vehicles.

The object of the invention is to provide an inexpensive seat support of simple and strong construction, easily manufactured and assembled, and permitting the seat supported thereby to be readily folded into small compass when desired.

A further object is to provide a seat support of particular utility in connection with motor vehicles of the closed body type, and in which the seat frame shall be supported directly upon the chassis frame of the vehicle.

Further objects and advantages will appear from the following description taken in connection with the accompanying drawings in which—

Figure 1 is a perspective view of a portion of a motor vehicle showing a folding or auxiliary seat.

Figure 2 is a perspective view of a form of seat support illustrating one embodiment of my invention.

Figure 3 is a vertical section through a portion of the seat bracket shown in Figure 2.

Referring to the drawings, 5 indicates a portion of a motor vehicle body of a type commonly designated as a coupé. The floor 6 of the body is provided with slots 7, 8, through which extend the legs 9, 10, of the seat frame. The frame comprises two bars bent as shown in Figure 2, to form the legs 9, 10, intermediate portions 11, 12, adapted to support a cushioned seat as shown in Figure 1. and upwardly extending ends 13, 14, to which a back-supporting frame 15 is pivotally attached, as at 16, 17. The pivot joints at 16, 17, are formed with stops permitting the back frame 15 to be raised to a position in the plane of the ends 13, 14, or to be swung forwardly to bring the back into folded position on the seat cushion, as shown in full lines in Figure 1.

The seat frame is supported upon a bracket 18 secured directly to the vehicle chassis. In the embodiment illustrated, the chassis frame comprises a longitudinal side member 19, and a transverse member 20, a gusset plate 21 seated upon the cross member 20 being provided to brace the joint. The base of bracket 18 is formed to fit the upper surface of the cross member and the gusset plate, and is secured thereto as by rivets 22. Apertured ears 23 extending upwardly from the base of bracket 18 serve to support the legs 9, 10, of the seat frame, bolts or pins 24 being inserted through the apertures in the ears and suitable holes in the ends of the legs. Shoulders 25 formed upon the legs are adapted to engage abutments 26 on the ears 23 to limit the rearward movement of the legs.

As will be readily understood from the foregoing description, the seat frame may be swung forwardly when desired, the back having first been folded down upon the seat. During such movement of the frame the legs 9, 10 will swing freely in slots 7, 8 until the forward edge of the seat comes to rest upon the vehicle floor in the position shown in full lines in Figure 1. In this position the chair is compactly disposed under the cowl of the vehicle out of the way of the occupants. A reversal of the movements brings the seat frame to the upright position shown in broken lines in Figure 1, where it is ready for use.

The mounting of the seat frame directly upon the chassis frame relieves the body or floor of any strains due to the auxiliary seat, and enables the seat support to be simplified and at the same time rendered stronger and more rigid than would be feasible were the support mounted upon the floor. The utilization of the chassis frame as, in effect, a base for the seat frame renders it possible to use a relatively light bracket for the pivotal support of the frame without sacrificing strength and durability, and also avoids the necessity for any reinforcement of the body or floor or other provision thereon to take the strains incident to the use of the seat.

It will be understood that the bracket 18 may be varied in form as necessary to accommodate various contours of chassis frames, and that many other changes in details of construction may be made without departing from the spirit and scope of the invention, and therefore I do not wish to be limited to the specific structure herein illustrated except as required by the language of the appended claims in view of the prior art.

I claim:

1. In seat structure for motor vehicles, the combination of a motor vehicle chassis, a body supported thereon having a floor; and a seat support pivotally connected to said chassis and extending upwardly through said floor, the floor being provided with an aperture permitting pivotal movement of said support.

2. In seat structure for motor vehicles, the combination of a motor vehicle chassis, a body supported thereon having a floor; and a seat support comprising bars, each pivotally connected to said chassis and extending upwardly through apertures in said floor, said apertures shaped to permit pivotal movement of said bars.

3. In seat structure for motor vehicles, the combination of a motor vehicle chassis, a body supported thereon having a floor; and a folding chair comprising two bars pivotally connected to said chassis and extending through apertures in said floor, said apertures shaped to permit pivotal movement of said bars, a seat supported upon said bars, and means for retaining said chair in position for occupancy and permitting it to be lowered to folded position.

4. In a seat structure for vehicles, a chassis frame having a cross member, a base plate secured to said cross member, said base plate provided with lugs and abutments, a seat frame having legs pivotally connected to said lugs and having stops engageable with said abutments, the parts being arranged to support the seat frame wholly from said chassis frame when the seat is in operative position for use.

5. In a vehicle seat structure, the combination of a chassis frame comprising a transverse frame member, a body supported upon said frame and having a slotted floor, a bracket mounted upon said frame member, a seat support pivotally secured to said bracket and extending through the slot of said floor, and a seat within said body mounted upon said support, the seat and support being carried entirely by the chassis when the seat is in position for use.

6. In a vehicle seat structure, a chassis frame, a vehicle body supported thereon comprising an apertured floor, a support for an auxiliary seat mounted directly upon said chassis frame below said floor, a seat frame carried by said support and extending upwardly through said apertured floor but entirely free therefrom, and a seat mounted upon said seat frame within said body.

In testimony whereof I affix my signature.

ROBERT K. JACK.